United States Patent [19]
Alexander

[11] Patent Number: 5,835,344
[45] Date of Patent: Nov. 10, 1998

[54] PORTABLE COMPUTER SYSTEM WITH INTEGRAL CARRYING CASE

[75] Inventor: Forrest Thomas Alexander, Houston, Tex.

[73] Assignee: Compaq Computer Corporation, Houston, Tex.

[21] Appl. No.: 715,198

[22] Filed: Sep. 18, 1996

[51] Int. Cl.$^6$ .............................. G06F 1/16; H05K 5/00; B65D 85/00
[52] U.S. Cl. .......................................... 361/683; 206/320
[58] Field of Search ........................ 364/708.1; 206/305, 206/320; 150/165; 190/102, 119, 900–903; 312/208.1; 361/680–687; 400/715; 248/118.1

[56] References Cited

U.S. PATENT DOCUMENTS

| | | | |
|---|---|---|---|
| 4,768,648 | 9/1988 | Glass ................................... | 206/305 X |
| 5,074,413 | 12/1991 | Ikuta et al. .............................. | 206/320 |
| 5,177,665 | 1/1993 | Frank et al. ............................. | 361/683 |
| 5,214,574 | 5/1993 | Chang ..................................... | 361/680 |
| 5,251,096 | 10/1993 | Hosoi et al. ......................... | 361/687 X |
| 5,400,903 | 3/1995 | Cooley .................................... | 206/320 |
| 5,596,482 | 1/1997 | Horikoshi ............................... | 361/683 |

OTHER PUBLICATIONS

"We've Anticipated Your Every Move" Compaq Computer Corporation Notebook PC Carrying Cases Brochure, pp. 4–11, 1995.

*Primary Examiner*—Michael W. Phillips
*Attorney, Agent, or Firm*—Pravel, Hewitt, Kimball & Krieger

[57] ABSTRACT

A portable computer is housed in an integral multi-purpose carrying case. The case protects the portable computer against damage when closed, yet the case is easily opened for use of the computer while in the case. Ergonomic wrist and arm support are provided to a user of the computer when by the case when it is opened. The case also furnishes dissipation of heat from the computer during use while it is resting on a user's lap.

22 Claims, 5 Drawing Sheets

PORTABLE COMPUTER SYSTEM WITH INTEGRAL CARRYING CASE

BACKGROUND OF THE INVENTION

1. Field of the Invention

The present invention relates to portable computer systems, and more particularly ones with integral carrying cases.

2. Description of the Related Art

The ever expanding demand for, and use of, personal computers has been a notable feature of recent years. Among the types of personal computers which are quite widely used are the portable type, whether laptop or notebook variety.

Portable computers permit, among other advantages, a user to perform computations, prepare and edit messages and documents, and send and receive information at any number of what were previously inconvenient places. Portable computers may now be used while away from an office, or while in transit, and in the absence of a source of external power. Portable computers range in size from hand-held size up to a size comparable to a loose-leaf binder or notebook.

In a number of technologies, including computers and their usage, a field of study called ergonomics is of interest. Ergonomics deals with how the machines or equipment, such as computers, can be used with minimized physical discomfort for the user or operator, particularly if the use is respective or for more than brief duration. In portable computer systems, ergonomic support of a user's wrists and their lower arms while using laptop computers has been a recurrent area of interest. Portable computers have not, so far as is known, completely satisfied the interest expressed for ergonomic support of a user's forearms or wrists.

Also, so far as is known, portable computers have been provided with carrying bags which were in effect no more than fabric bags or satchel cases. Although helpful for transport purposes, these fabric bags offered little of any protection of the computer against mechanical damage from impact or shock.

The previous carrying bags did not readily permit use of the computer. The bag had to be removed from the computer if it became necessary to connect the computer to an external device (such as a modem or the like) or power supply. If the cover was removed, there was then the problem of where to store the cover while the computer was in use, particularly when the user was in transit. It was often awkward to use the computers while they were in the case, since the fabric of the case exhibited a tendency to slide off a user's lap. Further, extended use of the computer on a user's lap could at times give rise to discomfort from excess heat.

SUMMARY OF THE INVENTION

Briefly, the present invention provides a new and improved portable computer system with an integral carrying case. The computer system includes a processor board having at least one microprocessor mounted on it for processing data. The processor board also includes other computer system electronic components on it, and is contained in a housing. The computer system also includes a transport or carrying case in which the housing of the computer system is fitted. The case has a receptacle formed in it with dimensions in which the housing is snugly fitted.

The computer housing has ports and openings for modems, add-on devices or peripherals, external power connectors, air vents or outlets, and the like. The carrying case is provided with corresponding openings and ports in it. Thus when the computer housing is fitted into the case, the portable computer system is adapted for connection with external devices and sources without having to be removed from its carrying case.

The carrying case is also provided with a support shelf which extends forwardly from the computer housing and its receptacle. The support shelf provides ergonomic support for a computer user's forearms while the computer is being used. A storage tray is provided within the support shelf for storage of equipment such as a cord, connector, stylus or the like. The carrying case is also provided with a carrying handle.

The portable computer system of the present invention with its integral carrying case protects the computer system from damage when closed, yet is easily opened. Once opened, the computer system may be operated in a stand-alone mode or easily connected to other external devices or power supplies. While in use, the carrying case provides ergonomic support for the computer user's forearms or wrists. The case also provides outlets for dissipation from heat from within the computer while in use.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
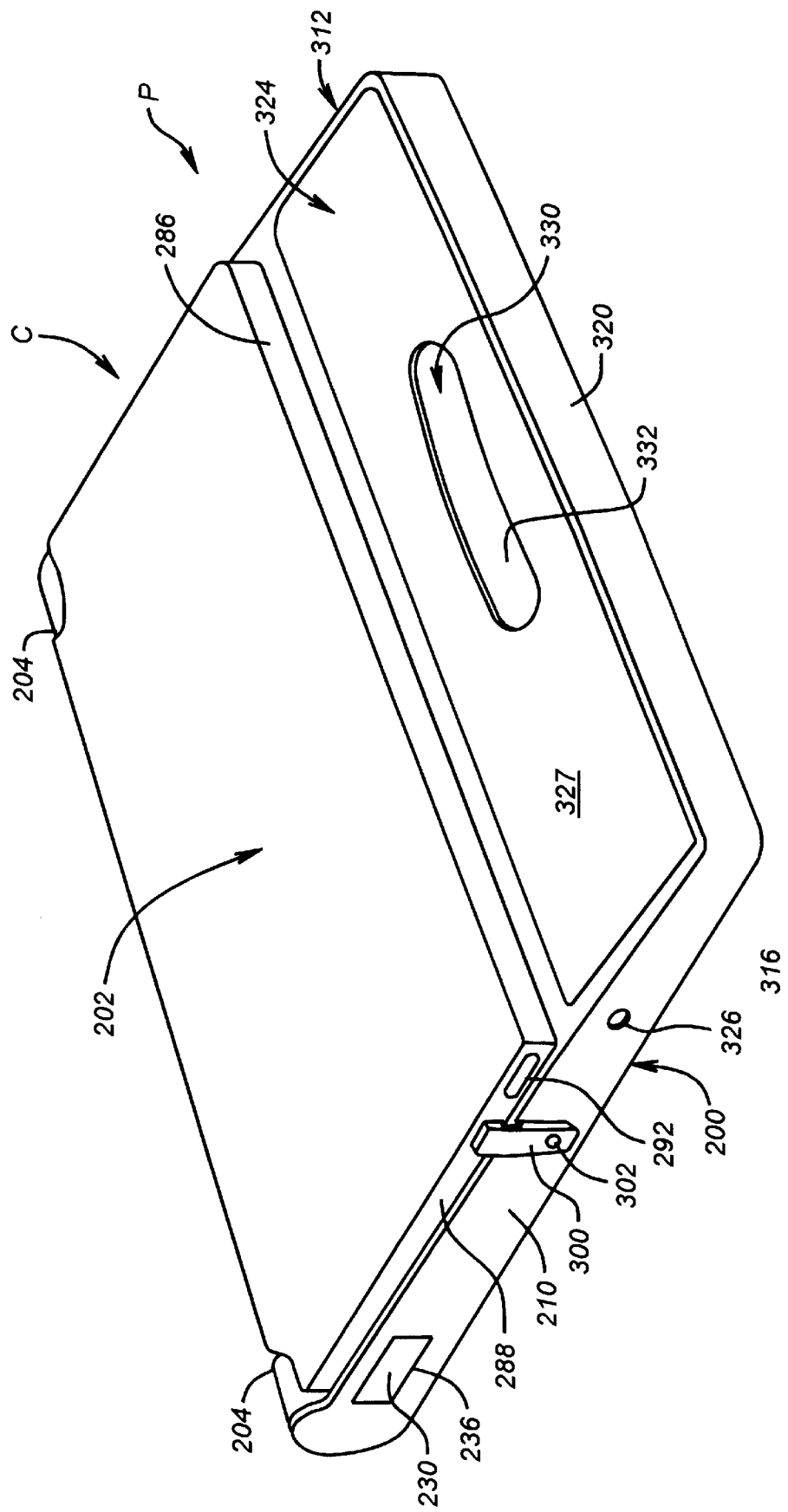
FIG. 1 is an isometric view of a computer system according to the present invention.
Figure 3:
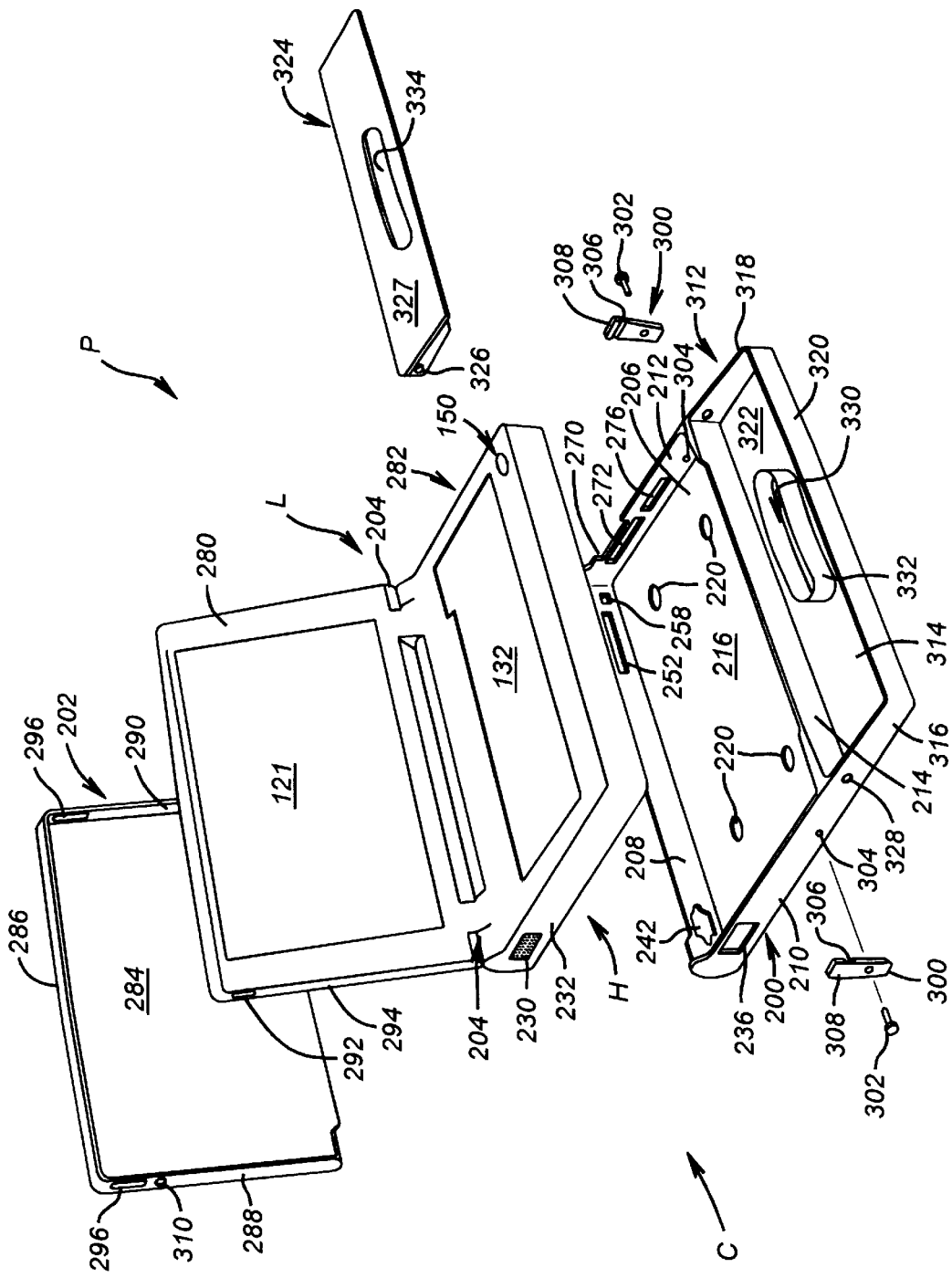
FIG. 3 is an exploded isometric view of the computer system of FIGS. 1 and 2
Figure 4:
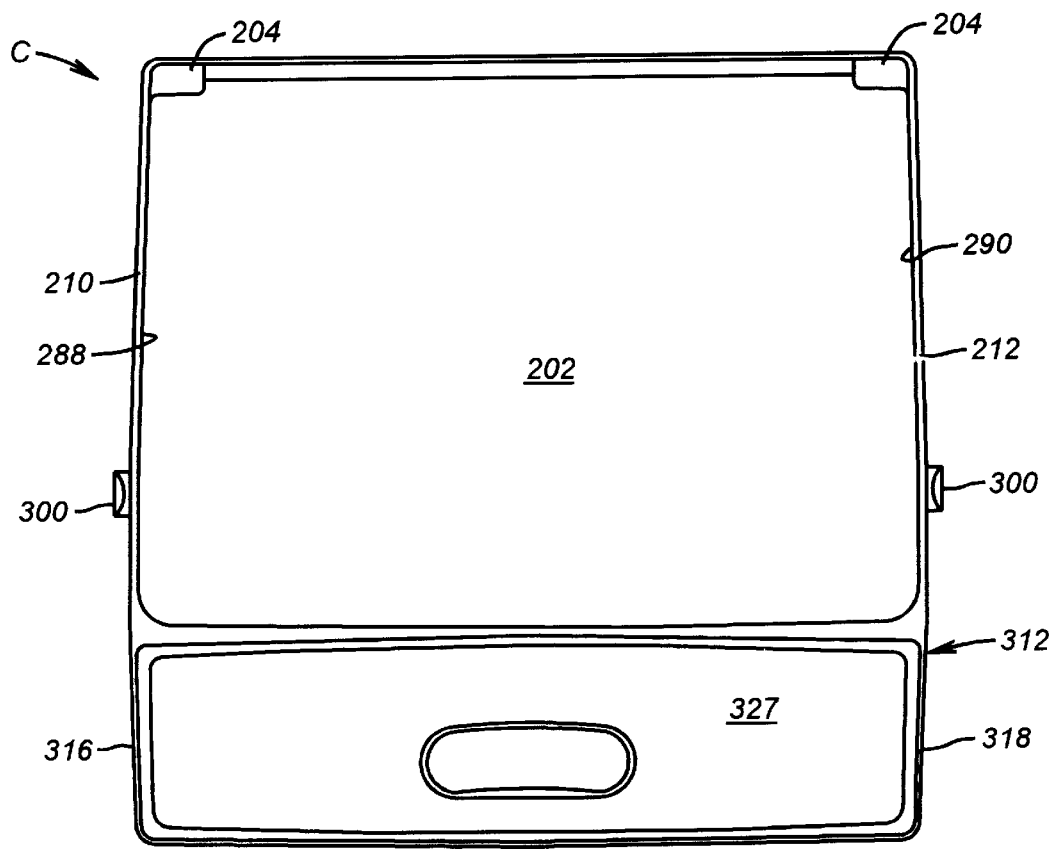
FIG. 4 is a plan view of the computer system of FIGS. 1 and 2.
Figure 5:
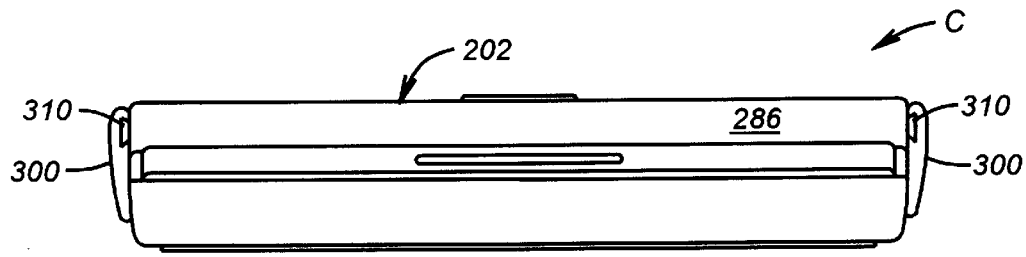
FIG. 5 is a front elevation view of the computer system of FIGS. 1 and 2.

In the drawings, the letter P designates generally a portable computer system according to the present invention, including a housing H (FIG. 3) containing a laptop computer L and an integral carrying case C (FIG. 1) into which the housing H is engagingly fitted. When so assembled, the portable computer P can be easily transported in the case C, but can be readily opened and used as an integral unit. Ergonomic wrist and arm support are provided to a user of the computer system P when in the integral carrying case C when both are opened.

Figure 2:
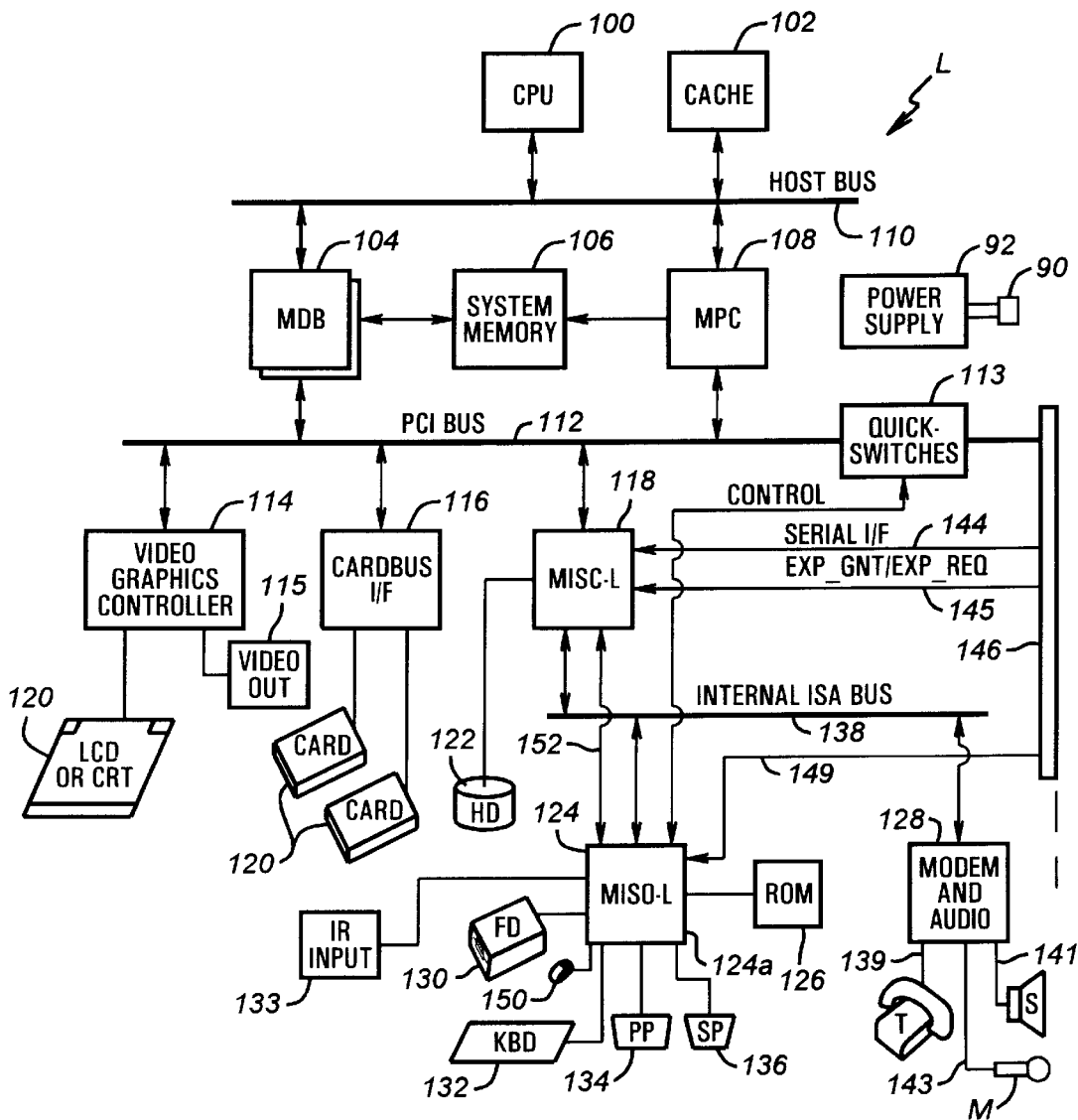
FIG. 2 is a schematic electrical circuit diagram of the computer system of FIG. 1.

The laptop computer L of the portable computer system P includes at least one microprocessor or CPU 100 (FIG. 2) mounted on a conventional processor board B in the conventional manner. FIG. 2 is a schematic block diagram of the laptop computer L which is an operationally autonomous apparatus which is preferably of a type which is detachable from an expansion base for remote computing operations. The expansion base when used typically provides expandability for functions not included in the laptop portion L due to space or power concerns. The laptop computer L may be of a type which is not connectable to an expansion base, as well. While the laptop computer L is docked into an expansion base or otherwise connected by at a power supply inlet 90 (FIGS. 2 and 6) to alternating current power, the laptop computer L operates on AC power. Rechargeable batteries in a rechargeable power supply 92 are also being recharged at this time. When computer L is detached from the source of AC power, the rechargeable power supply 92 (FIG. 2) provides power and the laptop computer L operates from battery power.

The Central Processing Unit (CPU) 100 is provided in the laptop computer L which is a conventional microprocessor such as the Pentium® from Intel Corporation or a similar processor. The CPU 100 couples to a host bus 110 for communicating with system logic such as a cache memory 102, a Mobile Peripheral Component interconnect bus cache controller (MPC) 108 and pair of Mobile Data Buffers (MDB) 104. The cache memory 102 is a conventional cache memory for the CPU 100 and preferably employs high speed synchronous burst static Random Access Memory (RAM). The MPC 108 provides an interface to the cache memory 102, and includes tag RAMs and other logic for creating various cache ways, size, and speed configurations of the cache memory 102.

The MPC 108 and the MDB 104 are also coupled to a system memory 106 and a peripheral component interconnect (PCI) bus 112. The MPC 108 provides address and control to system memory 106, which is typically comprised of up to 256 MByte of conventional dynamic random access memories (DRAMs). The MDB 104 provides a 64 bit data path between the host bus 110 and the system memory 106 and provides a 32-bit data path to the PCI bus 112. The MPC 108 and MDB 104 have three major functional interfaces: a processor/cache interface, a system memory interface, and a PCI bus interface. The MDB 104 is responsible for buffering data between the three interfaces while the MPC 108 is responsible for handling addressing, command and control. Each of these interfaces operate independently from the other and includes queues for read and write posting between any two of the three interfaces. The processor/cache interface allows the CPU 100 to pipeline cycles into read cycles and allows snoop accesses to the tag RAM to occur while the pipeline cycles are executing. The memory interface controls the system memory 106 and generates control signals to the MDB 104. The interface also allows read ahead operations for those PCI masters issuing a read multiple command. The PCI interface allows MPC 108 to act as a PCI master when the CPU 100 is accessing the PCI bus 112, or as a PCI slave when a PCI device accesses system memory 106.

The PCI bus is designed to have a high throughput and to take advantage of an increasing number of local processors supporting I/O functions. For example, most disk controllers, particularly Small Computer System Interface (SCSI) controllers, and network interface cards (NICs) include a local processor to relieve demands on the host processor. Similarly, video graphics boards often include intelligent graphics accelerators to allow higher level function transfer. Typically these devices incorporate the capability to act as bus masters, allowing them to transfer data at the highest possible rates. As mentioned, potential bus masters include the CPU/main memory subsystem (via MPC 108).

The PCI bus 112 provides a communications conduit between the laptop computer L and an expansion base. The PCI bus 112 in the laptop computer L includes a Quickswitch 113 for each signal of the PCI bus 112. In the preferred embodiment, the Quickswitches 113 are low loss series in-line MOSFET devices with the gate (control line) driven by a control signal CONTROL from a Mobile Super Input Output Logic or MSIO-L 124. The Quickswitch 113 can thereby be used to facilitate hot plug capabilities. When the laptop computer L is docked into an expansion base and the Quickswitches 113 are turned on, an extension portion of the PCI bus 112 present in the expansion base is coupled to the PCI bus 112 via expansion connector 146 to provide the extended PCI bus 112. Details of the expansion connector 146 and associated docking/undocking logic are provided in commonly owned co-pending U.S. patent application Ser. No. 08/684,255 entitled "COMPUTER SYSTEM INCORPORATING HOT DOCKING AND UNDOCKING CAPABILITIES WITHOUT REQUIRING A STANDBY OR SUSPEND MODE" filed Jul. 19, 1996, which is incorporated herein by reference.

In the laptop computer L, the PCI bus 112 further couples to a video graphics controller 114, a Cardbus interface 116 and a Mobile Integrated System Controller—Laptop 118 (MISC-L). The video graphics controller 114 further couples to a low power liquid crystal display (LCD) 121 or alternatively a cathode ray tube (CRT) or any other suitable monitor. The video graphics controller 114 is also provided with an output terminal 115 (FIGS. 2 and 6) for driving an external video monitor. The Cardbus interface 116 is provided for communicating with add-on cards 120 such as networking cards, modem cards, solid state storage cards and rotating storage cards preferably of a Personal Computer Memory Card International Association (PCMCIA) style. The MISC 118 provides an interface for an Industry Standard Architecture (ISA) bus 138, and an integrated drive electronics (IDE) hard drive interface for communicating with hard drives 122. The MISC 118 is also configurable based on an input pin for use in the laptop computer L and is further coupled to the internal ISA bus 138.

The MISC 118 bridges the PCI bus 112 to the ISA bus 138 or an ISA bus in the expansion base. The MISC 118 acts as both a master and slave on the PCI bus 112 and a bus controller on the ISA buses. The MISC I18 further preferably includes bus arbitration circuitry whose details are contained in commonly owned, co-pending application Ser. No. 08/684,255 incorporated by reference above.

In the preferred embodiment of the invention, the MISC 118 also as is conventional incorporates 8237 compatible direct memory access (DMA) controllers, an enhanced DMA controller for fast IDE hard drives, 8254 compatible timers, an 8259 compatible interrupt controller, hot docking support logic, system power management logic, and Plug-and-Play support.

The MISC 118 and the ISA bus 138 provide support for standard ISA peripherals such as those combined in a Mobile Super Input/Output (MSIO) 124 peripheral. The MSIO 124 peripheral has a combination of standard ISA peripherals, such as: a 146818 compatible real time clock (RTC), a floppy controller for interfacing to standard floppy drives 130; an 8051 compatible microcontroller for communicating with a standard keyboard 132, a conventional infrared communication input receiver 133 (FIGS. 2 and 6) and pointing device 150 (FIG. 2), for performing scanning and key code conversions on the keyboard 132, and for performing power management and hot docking functions; a universal asynchronous receiver transmitter (UART) for providing standard serial ports 136; and parallel port logic for a parallel port 134. A read only memory (ROM) 126 couples to the MSIO 124 for providing code to the 8051 microcontroller. Additionally, the ROM 126 provides basic input/output services (BIOS) code to the CPU 100, which is copied from the ROM 126 and shadowed in system memory 106 upon system initialization so that thereafter the 8051 microcontroller may access the ROM 126. A 1 bit MSIO Serial Bus (MSB) is provided for shadowing registers containing information relating to power management and hot docking. Ideally, the bus is designed to be extensible and very low latency.

When the laptop L is docked to an expansion base, the MSIO-L 124, and system components in the expansion base are coupled by an a standard $I^2C$-bus 149. The inter-integrated circuit or $I^2C$-bus 149 is a simple bi-directional two wire bus used to provide efficient control and identification functions between integrated circuitry. Details of the $I^2C$-bus can be found in the "The $I^2C$-Bus and How to Use It (Including Specification)," published by Phillips Semiconductors, January 1992. Briefly, the $I^2C$-bus 149 is formed of two lines: a serial clock line (SCL) and a serial data line (SDA). Each of these lines is bidirectional. The SCL line provides the clock signal for data transfers which occur over the $I^2C$-bus. The SDA line is the data line for data transfers which occur over the $I^2C$-bus. Each device connected to the $I^2C$-bus is recognized by a unique address. Low value series resistors (not shown) are typically provided at each device connection for protection against high-voltage spikes.

In the laptop computer L, a modem and audio peripheral 128 is also provided and coupled to the ISA bus 138. The modem and audio peripheral 128 includes a standard telephony communications port 139 (FIGS. 2 and 6) for coupling to a telephone T, and interfaces 141 and 143 for coupling to stereo speakers S and a microphone M, respectively.

The case C of the portable computer system P includes a lower case body 200 and a case cover 202 which is movably mounted to the case body 200 at a connector mechanism which is a part of the case C of the laptop computer L. A suitable connector mechanism, for example, is provided in the form of a pair of hinged or pivoted connectors 204 (FIG. 3) at rear side portions of the laptop computer L. Both the lower case body 200 and the cover 202 are preferably formed of a molded synthetic resin, preferably a suitable polypropylene, of a suitable rigidity and strength.

Figure 9:
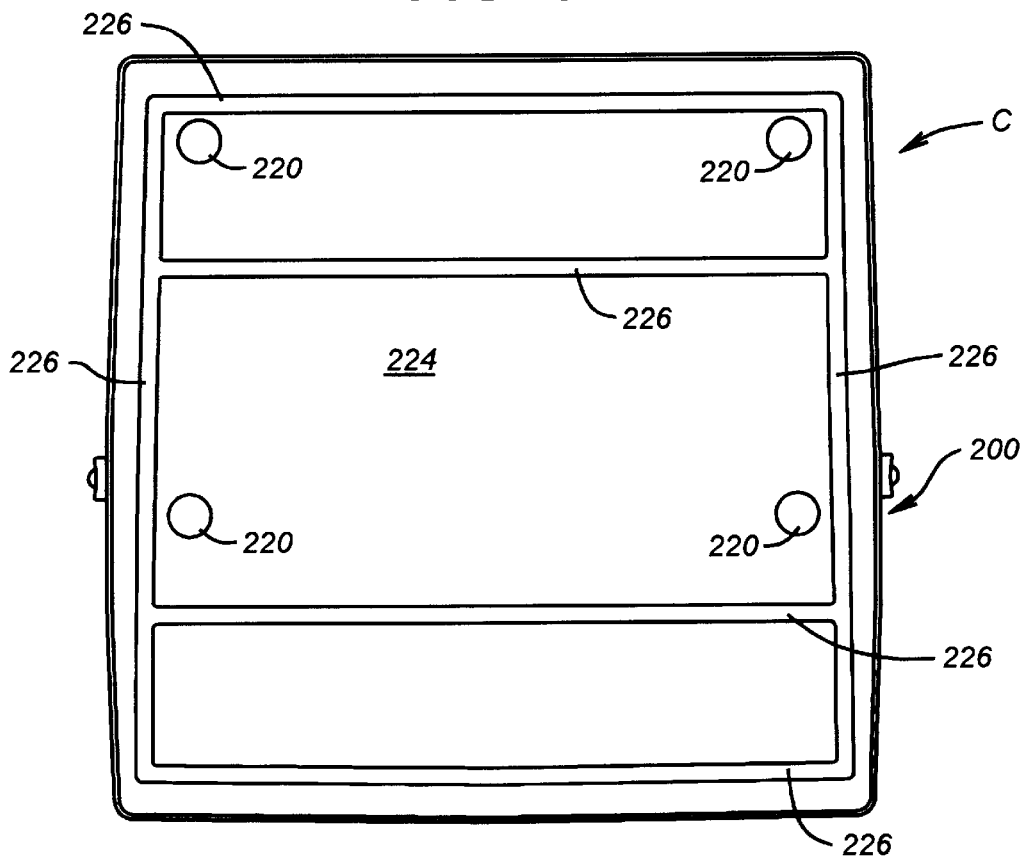
FIG. 9 is a bottom view of the computer system of FIGS. 1 and 2.

The lower case body 200 includes a receptacle 206 (FIG. 3) defined by a rear wall 208, sidewalls 210 and 212 and a forward wall or partition 214. The walls of the receptacle 206 are comparable in height to side walls of the housing H of the laptop computer L. The receptacle 206 of the case C is provided with a base or floor 216 and the interior or lateral dimensions between the rear wall 208 and partition 214, and the sidewalls 210 and 212, are selected to have an areal extent slightly greater than the corresponding lateral dimensions of the housing H. The particular dimensions of the receptacle 206 are thus related to the dimensions of the particular type of laptop computer L to be mounted in the case C. With the dimensional relation between the housing H set forth above, in this way, the housing H may be inserted and fitted firmly in place within the receptacle 206 with adequate frictional or mechanical engagement so that the housing H is fittingly received and firmly held in place in the case C once inserted. For removal purposes, a suitable number of access ports or openings 220 (FIGS. 3 and 9) are formed in the base 216 of the case C so that the housing H may be contacted by a user and pushed or urged out of the receptacle 206 when necessary. A base or bottom wall 224 of the case C is provided with a set of raised spacer ribs 226 extending across the bottom wall 224 for supporting the portable computer system P on a table, a user's lap, or other suitable work surface.

Figure 8:
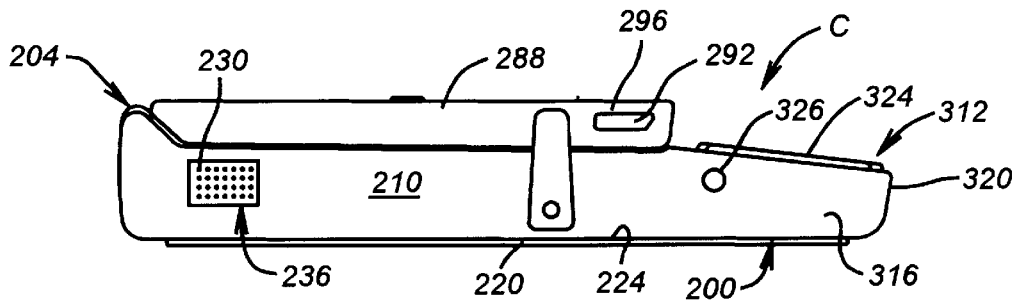
FIG. 8 is a left side elevation view of the computer system of FIGS. 1 and 2.

The laptop computer housing H is provided with an air outlet 230 (FIG. 3) in a sidewall 232 so that heat may be vented from its interior. The case C correspondingly has an air outlet 236 (FIGS. 3 and 8) formed in the sidewall 210 at a position aligned with the air outlet 232 of the housing H when the laptop computer L is mounted within the receptacle 206. In this way, heat from within the interior of the laptop computer L is vented externally of both the case C and the housing H when the computer P is in an operating mode.

The power supply connector 90 (FIGS. 2 and 6) of the laptop computer L is mounted on a rear wall 240 of the housing H so that an electrical supply cord and connector may be connected. The rear wall 208 of the case C has a port or opening 242 (FIGS. 3 and 6) formed in it in alignment with the connector 90 so that the portable computer system P may be connected to receive electrical power while mounted in the case C.

The laptop computer L includes a number of input/output (I/O) devices external of the housing H for providing external data inputs to the microprocessor 200 and other components of the personal computer system P, such as interface 143 (FIGS. 2 and 6) for the microphone M, interface 141 for the headphone/speaker S, video terminal 115 and the infrared (IR) input 133. These connectors or terminals are accessible at a location 250 (FIG. 6) on the rear wall 240 of the housing H. The rear wall 208 of the case C has a data input port 252 (FIGS. 3 and 6) correspondingly sized formed in it in alignment with the I/O terminals accessible at the location 250.

Figure 6:
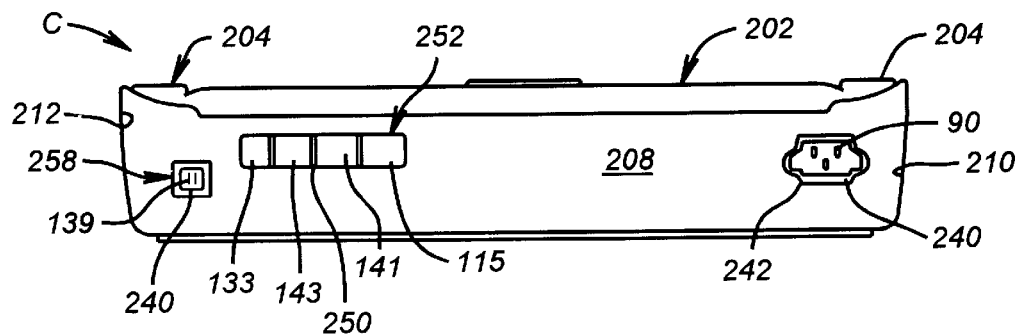
FIG. 6 is a rear elevation view of the computer system of FIGS. 1 and 2.

Similarly, the connector or phone terminal jack 139 (FIGS. 2 & 6) for connection of the modem 128 to the telephone T is formed in the rear wall 240 of the housing H as shown in FIG. 6. The rear wall 208 of the case C has a second data input port 258 (FIGS. 3 & 6) correspondingly sized and formed in it in alignment with the phone connector terminal 139. In this manner, the various input/output (I/O) devices external of the housing H of the personal computer system P are provided with access to the laptop computer L while the computer system P is mounted within its case C and operating.

Figure 7:
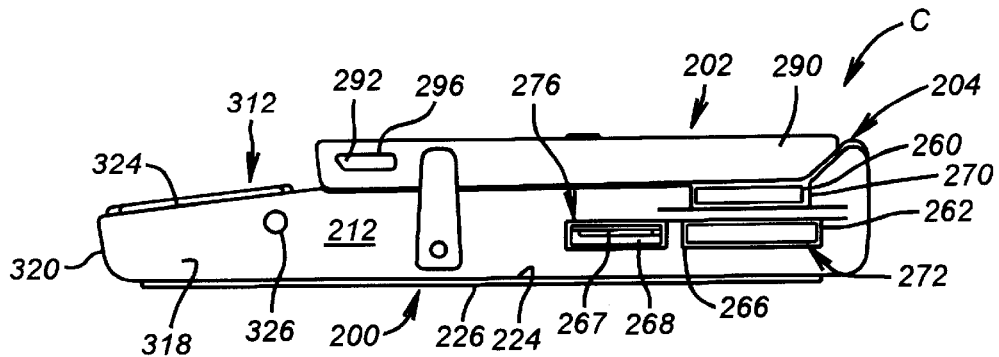
FIG. 7 is a right side elevation view of the computer system of FIGS. 1 and 2.

The laptop computer L is also adapted to receive a number of external cards 120 (FIG. 2), such as an international modem or other type of add-on cards of the type such as the PCMCIA style, as set forth above. Two card slots 260 and 262 (FIG. 7) are accessible at openings formed in a sidewall 266 of the housing H. The sidewall 212 of the case C has a corresponding pair of openings 270 and 272 (FIGS. 3 & 7) formed in it in alignment with the slots 260 and 262 so that the particular types of add-on cards 120 desired to used with the laptop computer L may be inserted into and connected with the laptop computer L while the computer L is mounted within its transport case C.

For add-on cards of the type shown at 120, an ejection lever 267 (FIG. 7) is accessible through an opening 268 formed in the sidewall 266 of the housing H. An opening 276 FIGS. 3 & 7) is formed in the sidewall 212 of the case C in alignment with the opening 266 for access to the ejection lever 267 so that the add-on cards 120 may be disconnected from the laptop computer L and removed therefrom while the personal computer system P is mounted within its carrying case C.

The data display 121 (FIGS. 2 & 3) of the portable computer system P is contained in a display panel 280 portion of the housing H hingedly or pivotally mounted with the lower body 282 of the housing H. The display panel 280 of the housing H is fitted within an interior recess 284 (FIG. 3) of the case cover 202 defined by a front wall 286 and side walls 288 and 290. As with the receptacle 206, the lateral dimensions of the display panel portion of the housing H and the interior dimensions of the recess 284 are substantially equal. In this manner, the display panel portion 280 of the housing H is thus fittingly received within the case cover 202 of the case C.

The display panel 280 of the housing H is pivotally mounted at the hinged connector mechanisms 204 between an open position (FIG. 3) and a closed or transport position (FIG. 1) on the lower body portion of the housing H. The display panel 280 has a releasable locking mechanism in the form of movable buttons or slides 292 mounted along each of its side walls 294. The case cover 202 has a set of release ports 296 formed at each of its sidewalls 288 and 290 aligned with the release mechanism buttons or slides 292 of the locking mechanism data display panel 280. When the release mechanisms 292 are engaged, the display panel housing 280 and its fitted case cover 202 are then pivotally movable upwardly at hinged connectors 204 with respect to the remainder of the housing H and case C. Accordingly the data display 121 is visible (FIG. 3) and the keyboard 130 and mouse or pointer 150 are accessible, while the computer P is contained in it case C.

A connector clasp 300 is pivotally mounted by a connector pin or stud 302 to an opening 304 formed in each of the side walls 210 and 212 of the lower case body 200. Each connector clasp 300 has a connector slot 306 formed in an upper end 308. The connector slots 306 are adapted to slide over and engage corresponding connector tabs or studs 310 mounted extending outwardly from each of the side walls 288 and 290 of the case cover 202. The connector clasps 300 and the connector tabs 310 serve as an additional closure or locking mechanism for the case C and for the portable computer system P in addition to the release mechanisms 292.

The case C includes a support shelf 312 formed extending forwardly from the receptacle 206 to support a computer user's forearms and wrists while using the portable computer system P. The support shelf 312 (FIG. 3) is preferably integrally formed with the remainder of the lower case body 200 extending forwardly from the inner forward wall or partition 214. The support shelf 312 includes a storage case or tray 314 formed within it defined by sidewalls 316 and 318 extending forwardly from the partition 214 to a front wall 320 and defined by a lower wall portion 322 which is a forward extension of the base or floor 216 of the receptacle 206. The storage tray 314 is adapted to receive connector cords or cables for the portable computer system P as well as pointers, styluses or other apparatus for use with the portable computer system P.

The support shelf 312 further includes a pivotally movable cover 324 which has connectors pins 326 formed extending outwardly from side portions thereof for insertion into corresponding openings 328 formed in each of the sidewalls 316 and 318. The movable cover 324 is thus pivotable upwardly from the storage tray 314 to open and close the storage tray for access to the components therein. Preferably, an upper surface 324 of the movable cover 324 is provided with a soft and yieldable synthetic resin. This provides a padded upper surface for the movable cover 324 in supporting a user's wrists and forearms when using the portable computer system P.

An upwardly extending interior opening or passage 330 (FIG. 3) is formed in the support shelf 312 within an upwardly extending wall 332 formed within the storage tray 314. A correspondingly shaped opening 334 is formed in the movable cover 324. When the movable cover 324 is moved downwardly to close the storage case 314 (FIG. 1) the openings 330 and 334 are aligned, providing a carrying handle for gripping the portable computer system P within its case C for carrying and transporting.

From the foregoing, it can be seen that the portable computer system P of the present invention can be connected to external input/output devices and power supplies and operated while contained with its case C. The portable computer P can also be easily transported in the case C. A user can, however, readily open the case C and operate the integrally contained computer P while in transit or at a remote location. Further, ergonomic wrist and arm support are provided for the user while using the computer P within its integral carrying case C.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A portable computer system, comprising:
   a processor board having at least one microprocessor mounted thereon for processing data;
   a housing containing said processor board;
   a data display for displaying data processed by said microprocessor;
   a display panel containing said data display;
   a case having said housing fitted therein;
   said case having:
      a lower case body with a receptacle formed therein to fittingly receive said housing; and
      a case cover movable mounted with said lower case body to open and close said case;
      said case cover having said display panel mounted therein, and including
         a release mechanism for allowing movement of said display panel with respect to said case cover.

2. The portable computer system of claim 1, wherein:
   said case has an opening formed therein adjacent to said receptacle for access to apply force to remove said housing from said receptacle.

3. The portable computer system of claim 1, further includes an I/O device in said housing for connecting said microprocessor to an external data input; and
   wherein said case has a data input port formed therein for passage of a connector connecting said I/O device to external data input.

4. The portable computer system of claim 3, wherein said external data input is modem.

5. The portable computer system of claim 3, wherein said external data input is a infrared signal source.

6. The portable computer system of claim 3, wherein said I/O device in said housing connects said microprocessor to an external data output and wherein a port in said case provides passage of a connector connecting said I/O device to said external data output and wherein said external data output is a modem.

7. The portable computer system of claim 3, wherein said I/O device in said housing connects said microprocessor to an external data output and wherein a port in said case provides passage of connector connecting said I/O device to said external data output and wherein said external data output is a loudspeaker.

8. The portable computer system of claim 3, wherein said I/O device in said housing connects said microprocessor to an external data output and wherein a port in said case provides passage of a connector connecting said I/O device to said external data output and wherein said external data output is a multimedia video display.

9. The portable computer system of claim 3, wherein said I/0 device in said housing connects said microprocessor to an external data output and wherein a port in said case provided passage of a connector connecting said I/O device to said external data output and wherein said external data output is a microphone.

10. The portable computer system claim 3, wherein said I/O device in said housing connects said microprocessor to an external data output and wherein a port in said case provides passage of a connector connecting said I/O device to said external data output and wherein said external data output is a headphone.

11. The portable computer system of claim 1, wherein said computer system includes:
an air outlet in said housing venting heat from said housing; and wherein:
said case has an air outlet past formed in said receptacle aligned with said housing air outlet for venting heat from said housing externally of said case.

12. The portable computer system of claim 1, further including;
a connector mechanism for attaching said case cover to said lower case body.

13. The portable computer system of claim 1 further including:
said case cover having a release port formed in it adjacent said display panel release mechanism.

14. The portable computer system of claim 1, wherein said case includes:

a support shelf extending forward from said receptacle to support a computer user's forearms while using the computer.

15. The portable computer system of claim 14, wherein:
said support shelf has a carrying handle formed therein.

16. The portable computer system of claim 14, further including:
a storage tray formed in said support shelf.

17. The portable computer system of claim 16, further including:
a movable cover for opening and closing said storage tray.

18. The portable computer system of claim 1, wherein said case includes:
a storage tray formed in said case extending forward from said receptacle.

19. The portable computer system of claim 18, further including:
movable cover for opening and closing said storage tray.

20. The portable computer system of claim 19, wherein:
said movable cover has a padded upper surface.

21. The portable computer system of claim 1, wherein:
said case has a carrying handle mounted therewith.

22. A portable computer system comprising:
a processor board having at least one microprocessor mounted thereon for processing data;
a data display for displaying data processed by said microprocessor;
a housing comprising:
a lower body containing said processor board; and
a display panel containing said data display, said display panel connected to the lower body; and
a case comprising a lower case body and a case cover, said case including:
said lower case body having said housing lower body fitted therein;
said case cover having said display panel fitted therein, and
said display panel including a release mechanism for allowing movement of said display panel with respect to said case cover.

* * * * *

UNITED STATES PATENT AND TRADEMARK OFFICE
CERTIFICATE OF CORRECTION

PATENT NO. : 5,835,344
DATED : November 10, 1998
INVENTOR(S) : Forrest Thomas Alexander It is certified that error appears in the above-identified patent and that said Letters Patent is hereby corrected as shown below:

Column 8,
Line 45, delete "movable" and insert therefor -- movably --
Line 59, after "to" insert -- the --
Line 62, after "is" insert -- a --

Column 9,
Line 19, delete "provided" and insert therfor -- provides --

Column 10,
Line 19, after "including" insert -- a --

Signed and Sealed this

Twenty-sixth Day of July, 2005

JON W. DUDAS
*Director of the United States Patent and Trademark Office*